United States Patent [19]

Hoffman et al.

[11] 4,006,095
[45] Feb. 1, 1977

[54] STABLE HYDROCARBON SOLUTIONS OF ALUMINUM HYDRIDE

[75] Inventors: Doyt K. Hoffman; Ricardo O. Bach; Conrad W. Kamienski, all of Gastonia, N.C.

[73] Assignee: Lithium Corporation of America, New York, N.Y.

[22] Filed: Mar. 31, 1972

[21] Appl. No.: 239,993

[52] U.S. Cl. .................................. 252/188; 8/107; 252/105; 423/644; 423/645; 260/448 A
[51] Int. Cl.² ........................ C01B 6/06; C07F 5/06
[58] Field of Search ............... 252/188, 105; 8/107; 423/127, 644, 645; 260/448 A

[56] References Cited

UNITED STATES PATENTS

| | | | |
|---|---|---|---|
| 2,576,311 | 11/1951 | Schlesinger | 252/188 |
| 2,680,059 | 6/1954 | Bragdon | 423/644 |
| 3,556,740 | 1/1971 | Murib | 423/644 |
| 3,642,853 | 2/1972 | Murib et al. | 423/645 |

*Primary Examiner*—Benjamin R. Padgett
*Assistant Examiner*—Irwin Gluck
*Attorney, Agent, or Firm*—Wallenstein, Spangenberg, Hattis & Strampel

[57] ABSTRACT

Preparation of stable solutions of aluminum hydride in liquid hydrocarbons such as benzene or toluene by a one-step reaction between, for instance, 1 mole of aluminum chloride with 3 moles of lithium hydride in said liquid hydrocarbon medium and in the presence of a weak ether base such as dimethyl ether, an aliphatic tertiary amine such as trimethylamine being added.

14 Claims, No Drawings

STABLE HYDROCARBON SOLUTIONS OF ALUMINUM HYDRIDE

Our invention is directed to the preparation of novel and highly advantageous stable liquid hydrocarbon solutions of $AlH_3$ which can be used effectively as selective hydrogenating and reducing agents in organic reactions of various types.

$AlH_3$ heretofore has been well known as a selective hydrogenating and reducing agent useful in various organic reactions. Various methods for its production and various uses thereof have heretofore been disclosed. One of such methods involves a twostep procedure, starting with LiH, wherein the latter is initially reacted with $AlCl_3$ in the presence of certain ethers, notably, diethylether, to produce lithium tetrahydridoaluminate or lithium aluminum hydride ($LiAlH_4$), and the latter is then reacted with $AlCl_3$ in the presence of certain ethers, usually diethylether. Solutions of $AlH_3$ in ethers are quite unstable. This is particularly the case where the ether is diethylether (DEE). Somewhat more stability occurs where the ether is dimethylether (DME), and intermediate stabilities result where the ethers are tetrahydrofuran (THF) and the "glymes" which are mono-, di-, tri- and tetraethylene glycol dimethyl ethers.

Another heretofore known procedure for preparing $AlH_3$, starting with $LiAlH_4$, involves reacting the latter with a tertiary amine hydrochloride in the presence of an ether. Such reactions cannot satisfactorily be carried out in liquid hydrocarbon media because of the lack of solubility of the $LiAlH_4$ in such media. However, tertiary amine complexes ($AlH_3.NR_3$) can be isolated from the reaction of the $LiAlH_4$ with the tertiary amine hydrochloride in the presence of an ether, and said complexes can be dissolved in liquid aromatic hydrocarbons such as benzene.

Certain of the aforesaid procedures for the preparation of $AlH_3$, and reducing organic reactions in which $AlH_3$ is used, are shown in Ber. 75, 2003 (1942); J. Am. Chem. Soc. 69, 1199 (1947); J. Am. Chem. Soc. 77, 3164 (1955); German Pat. Nos. 1,024,062; 1,039,041 and 1,141,623; J. Am. Chem. Soc. 88, 1464 (1966) and J. Am. Chem. Soc. 90, 2927 (1968).

It has also been known that tertiary amines, for instance, trimethylamine (TMA), stabilize $AlH_3$ in its solutions, the addition of TMA to ethereal solutions of $AlH_3$ leading to the formation of complexes such as $AlH_3.N(CH_3)_3$, as indicated above and as obtained by various alternative procedures. J. Am. Chem. Soc. 83, 535 (1961).

$LiAlH_4$, as well as $NaAlH_4$, are effective selective reducing agents, various functional groups being reduced efficiently while aromatic and ethylenic double bonds remain largely unaffected. However, due to the high cost of producing, and the resultant necessary high selling price, of such reducing agents, in terms of dollars per pound of active hydrogen, efforts have been made to find reducing agents which are effective but which provide more economical sources of active hydrogen than the tetrahydridoaluminates. Such efforts have also been directed to overcoming the serious restriction on the utilization of $LiAlH_4$ due to the fact tat there are only limited types of solvent media in which it may be employed. Thus, as indicated above, nonpolar liquid solvent media such as hydrocarbons, while desirable as media in which to carry out various reducing organic reactions, generally cannot be utilized.

Compounds exemplified by diisobutylaluminum hydride, $HAl(C_4H_9)_2$, are soluble in various liquid hydrocarbons and can be used as reducing agents but their cost, in terms of active hydrogen per pound, is quite high.

Sodium bis (2-methoxy ethoxy) dihydridoaluminate, $NaAl(OCH_2CH_2OCH_3)_2H_2$, in the form of 70% solution in benzene (U.S. Pat. No. 3,507,895) has been suggested for use as a reducing agent for various organic reactions. However, it has a very low active hydrogen content, the price is high and, in addition, its use introduces certain undesirable aspects in certain types of reducing reactions.

Still another type of compound, exemplified by sodium diethyl dihydridoaluminate, $NaAl(C_2H_5)H_2$, has been offered for sale in the form of a 25% solution in xylene for use as a reducing agent. As in the case of sodium bis (2-methoxy ethoxy) dihydridoaluminate, the presence of an alkali metal ion has to be taken care of in the workup after the reducing reaction although the cost of the active hydrogen per pound is materially less than in the case of the others of said reducing agents referred to above. Furthermore, the basicity of the hydrolyzed product solutions is a disadvantage where sensitive groupings such as aldehydes or ketones are present in the desired product. The relative recently quoted selling price by certain producers of various of said reducing agents calculated on the basis of per pound of active hydrogen is as follows:

| Compound | Sales Price (Approximately) ($/lb active H) |
|---|---|
| $LiAlH_4$ | 280 |
| $NaAl(C_2H_5)_2H_2$ | 152 |
| $NaAl(OCH_2CH_2OCH_3)_2H_2$ | 1400 |
| $AlH(C_4H_9)_2$ | 210 |

In accordance with our invention, solutions of $AlH_3$ in liquid hydrocarbons can be prepared which exhibit good stability and which provide active hydrogen at a materially lesser cost per unit weight than is characteristic of at least most of the heretofore known compounds referred to above. In those solutions made in accordance with out invention in which toluene or benzene and dimethylether are utilized, as in Examples I and II set forth hereafter, there is only a slight decay in active hydrogen content at $-2°$ C or lower over a period of about 3 weeks in a sealed bottle, but at room temperature and higher temperatures such solutions are not stable. When, in such solutions, the dimethylether is essentially replaced by aliphatic tertiary amines, such as trimethylamine or triethylamine, and where the molar ratio of the said tertiary amine to the $AlH_3$ is 1:1 or not substantially less than 1 to 1, as in Examples III and IV set forth below, the stability is exceptionally good, such solutions exhibiting little, if any, loss of active hydrogen at 35° C over a period of 3 weeks in a sealed bottle.

In the practice of our invention, LiH and $AlCl_3$ are reacted in a mole ratio of essentially 3 to 1 in a liquid hydrocarbon medium, particularly benzene or toluene, or mixtures thereof, and in the presence of certain ethers, particularly dimethylether (DME). It is especially advantageous that the mole ratio does not exceed 3.2 to 1 but, in certain cases, it may be as high as 3.7 to 1 with some sacrifice as to stability, the term "essentially" encompassing a mole ratio up to 3.7 to 1. The AlH$_3$.DME complex which results, which is of a mole ratio of about 1:1, has been found to be soluble in said liquid hydrocarbon and sufficiently stable at low temperatures to be handled without undue losses. It is essential to the practice of our invention that the reaction between the LiH and the AlCl$_3$, in the stated mole ratio, be carried out in a liquid hydrocarbon medium and, in addition, in the presence of an ether. Conversions in the range of about 80% and upwards are obtained.

In the practice of the invention, it is particularly advantageous to utilize, an an initiator in the reaction between the LiH and the AlCl$_3$, a small amount of proportion of preformed AlH$_3$ or an alkali metal tetrahydridoaluminate such as LiAlH$_4$ or NaAlH$_4$.

While, as pointed out above, benzene or toluene, or mixtures thereof, are especially satisfactory liquid hydrocarbons for use as the hydrocarbon reaction medium, other liquid hydrocarbons can be used illustrative examples of which are cyclohexane, isooctane, o-, m- and p-xylenes and mixtures of two or more of them, methylbenzene, isopropylbenzene, diethylbenzene and the like. Generally, liquid aromatic hydrocarbons are particularly preferred. It will be understood that the liquid hydrocarbons utilized are those in which the AlH$_3$ complexes are soluble.

It is particularly desirable to use DME as the ether in the reaction medium, but various other weak base ethers can be used illustrative of which is THF. Acetal types of ethers are not satisfactory. Generally speaking, the ethers utilized should have dielectric constants of about 5 or higher.

While it is particularly desirable to utilize LiH as the starting alkali metal hydride, it is also within the scope of our invention to use other alkali metal hydrides as, for example, NaH, KH, CsH and RbH. Similarly, where alkali metal tetrahydridoaluminates are used as initiators, the alkali metal can be, in addition to Li or Na, K, Cs and Rb. While the particle size of the LiH is quite variable so long as clean surfaces are maintained through the reaction, for good rates of reaction the particle size should be in the range of about −14 to +325 mesh and, better still, in the range of −35 to +100 mesh.

The tertiary amines, used as stabilizing agents, are of aliphatic (which includes cycloaliphatic) character. Illustrative examples thereof are trimethylamine, triethylamine, dimethylethylamine, methyldiethylamine, tripropylamine, triisopropylamine, dimethylpropylamine, cyclohexyldimethylamine, cyclooctyldimethylamine and dicyclohexylmethylamine. Trimethylamine is especially satisfactory.

While AlCl$_3$ is most advantageously used in the reaction with the alkali metal hydride to produce AlH$_3$ in accordance with the present invention, AlBr$_3$ as well as AlI$_3$ can be used in place thereof.

The liquid hydrocarbon solutions of AlH$_3$ complex made in accordance with our invention may vary in concentration. The maximum concentration, being about 2 molar in AlH$_3$, contains about 79% liquid hydrocarbon, 12% TMA, 7% AlH$_3$ and 2% DME, or, in the case of TEA, 68% liquid hydrocarbon, 23% TEA, 7% AlH$_3$ and 2% DME, using the reactants involved. A 2 molar THF complex solution contains about 77% liquid hydrocarbon, 16% THF and 7% AlH$_3$. The lower limit of AlH$_3$ complex in solution is zero molarity.

The following examples are illustrative of the production of stable hydrocarbon solutions of AlH$_3$ in accordance with our present invention. It will be understood that procedural variations may be made and variant stable solutions of AlH$_3$ can be prepared in the light of the guiding principles and teachings disclosed herein. All temperatures recited are in degress C.

EXAMPLE I

A one-liter, three-neck, round-bottom flask is fitted with a 250 ml dropping funnel, an argon purge inlet with thermometer and a dry-ice condenser attached to an oil bubbler. A magnetic stirrer and stirring bar are used for agitation. After thoroughly purging the apparatus with argon, 6g of −100 mesh LiH and 0.2 to 0.3 g of LiAlH$_4$ or an equivalent amount of preformed AlH$_3$ are added. DME, passed through activated alumina for drying, is condensed into the flask until 200 ml are collected at substantially below −25°.

Apart from the above, 33 g of anhydrous aluminum chloride are dissolved in 150 ml of distilled toluene by the slow addition of gaseous DME while maintaining the temperature between 25° and 50°. This produces a clear solution with some insoluble impurities in suspension. If allowed to stand for several hours, these impurities tend to agglomerate, allowing the clear solution to be decanted. However, this separation is not necessary.

The AlCl$_3$ solution is then slowly added to the cold LiH-DME slurry by way of the dropping funnel. After all of the AlCl$_3$ is added, the slurry is allowed to warm to 5° to 10° while excess DME escapes and is collected for further use. At this point, dry ice is added to the condenser again to retain the remaining DME. Two liquid phases are noted to separate when the mixture is allowed to settle, a lower phase being high in DME and AlCl$_3$ and an upper phase containing mostly toluene. As the conversion progresses, the activity increases in the upper toluene-rich phase and eventually results in a homogeneous solution. In addition to the above, a second phenomenon is observed. Near the end of the reaction period, which is generally 2 hours, the suspended solids slowly change in color from light gray to nearly black. This is evidently due to the precipitation of some Al from decomposed AlH$_3$ or AlCl$_3$.

At the end of the reaction period, sufficient toluene is added to the cool solution (10°–15°) to give a final concentration of AlH$_3$ of about 0.5 molar. The solids are then removed by filtration and the conversion determined by hydrolyzing a small sample of the clear solution and measuring the volume of hydrogen produced; hence 6.45 g of AlH$_3$ are contained in 450 ml of solution and constitutes a yield of 86%. The solution is about 0.48 molar in AlH$_3$.

EXAMPLE II

Example 1 is repeated with benzene solvent in place of toluene and with commercial Class VI LiH (−35 mesh) in 20% excess. After 3 hours at a reaction temperature of 5° to 10°, a conversion of 93% is obtained as evidenced by hydrolysis of a filtered sample and measurement of evolved hydrogen. The solution is practically chloride-free; only a slight turbidity is produced when a 2 ml sample is hydrolyzed in acid and treated with AgNO$_3$ solution.

EXAMPLE III

The procedure of Example I is repeated up to a point where additional toluene is added. At this time, toluene is added sufficient to give a 1.0 molar solution of AlH$_3$. Trimethyl amine (TMA) is then admitted below the surface of the liquid until 0.25 mole is added. This produces a 1:1 complex of the form AlH$_3$.TMA. By raising the temperature of the solution to about 35°, most of the DME is expelled; about 3% residual DME is left in solution as shown by GC analysis of the solution. After filtration, the conversion is shown to be 85% by active hydrogen analysis; the clear solution is 1.0 molar in AlH$_3$.

EXAMPLE IV

The procedure for the preparation in Example III is repeated up to the addition of TMA. Triethylamine (TEA) is then added by syringe to give 1:1 complexation of the form AlH$_3$.TEA. The temperature of the solution is then raised to 35° and the DME content is reduced to less than 2%. The conversion is 84%, producing a solution of 0.98 molarity.

EXAMPLE V 33 g of aluminum chloride is slurried in 150 ml of toluene; tetrahydrofuran (THF) is then added dropwise until all the AlCl$_3$ is complexed to a total of about 50 ml of THF. This forms a slurry of AlCl$_3$.THF in toluene that is sparingly soluble.

The AlCl$_3$ slurry is then slowly added to 17.9 g of finely divided NaH in 200 ml of THF at such a rate as to maintain the temperature of the reaction near boiling; LiAlH$_4$ is used as initiator. The mixture is stirred for an additional 2 hours and filtered. The clear solution of 400 ml is about 0.50 molar in AlH$_3$ and represents a yield of 80%.

EXAMPLE VI

Utilizing the equipment, and the ingredients in the same proportions, set forth in Example I, the DME is admitted slowly under the liquid surface and with stirring until about 200 ml are collected. The slurry is then allowed to warm to 5°–10° by allowing DME to escape. At this point, cooling is continued to retain the DME and maintain the temperature in the range of 5°– ° for several hours. The procedure of Example I is then followed for isolation of the solution. The conversion, found by active hydrogen, is 84%.

EXAMPLE VII

Utilizing the equipment, and the ingredients in the same proportions, set forth in Example I, the AlCl$_3$, toluene, LiAlH$_4$ and DME are added in that order. The LiH is then gradually added to the cold solution. The reaction is then carried out and worked up as in Example I. The conversion, by active hydrogen analysis, is found to be 87%.

Optimum results are obtained, with respect to the practice of our present invention, where, in the conversion reaction to produce AlH$_3$ from AlCl$_3$, the weakest base ether is employed, and where, in the use of the aliphatic tertiary amine stabilization agents, the strongest base is selected. Such final stabilized solutions of the AlH$_3$ in the aromatic hydrocarbon solvents, generally speaking, contain only a small content of the ether used in the preparatory steps, ordinarily not more than about 3% by weight of the solution and usually in the range of about 1 to 3%. This low content of ether appears to enhance the stability of the solutions.

AlH$_3$ solutions made in accordance with our present invention, as indicated above, have highly effective utility in various organic reactions, notably as reducing agents. In certain cases, inorganic reactions are substantially quantitative without the formation of undesirable byproducts. For instance, SiCl$_4$ is transformed essentially quantitatively to SiH$_4$; and PCl$_3$ is transformed essentially quantitatively to PH$_3$ in accordance with the following equations, respectively:

$$3\ SiCl_4 + 4\ AlH_3 \rightarrow 3\ SiH_4 + 4\ AlCl_3 \tag{1}$$

$$PCl_3 + AlH_3 \rightarrow PH_3 + AlCl_3 \tag{2}$$

We claim:
1. In a method of preparing liquid hydrocarbon solvent solutions of AlH$_3$, the steps which comprise reacting essentially 3 moles of an alkali metal hydride with 1 mole of AlHal$_3$, where Hal is halogen selected from the group consisting of chlorine, bromine and iodine, in a liquid hydrocarbon solvent medium in the presence of an ether selected from the group consisting of tetrahydrofuran and dimethylether.
2. The method of claim 1 in which the alkali metal hydride is selected from the group consisting of sodium hydride and lithium hydride, and Hal is chlorine.
3. The method of claim 1 in which the liquid hydrocarbon solvent is at least one member selected from the group consisting of benzene and toluene, and Hal is chlorine.
4. The method of claim 1 in which Hal is chlorine.
5. The method of claim 1 in which Hal is chlorine, and in which there is included in the reaction mixture an initiator in the form of at least one member selected from the group consisting of a preformed AlH$_3$ and an alkali metal tetrahydridoaluminate.
6. The method of claim 1 which includes the step of adding a stabilizing lower aliphatic tertiary amine or cycloalkyl tertiary amine to the composition after the formation of the AlH$_3$.
7. The method of claim 6 in which said amine is selected from the group consisting of trimethylamine and triethylamine.
8. In a method of preparing aromatic liquid hydrocarbon solvent solutions of AlH$_3$, the steps which comprise reacting essentially 3 moles of LiH with 1 mole of AlCl$_3$ in at least one aromatic liquid hydrocarbon selected from the group consisting of benzene and toluene, and in the presence of dimethylether, and then adding a member selected from the group consisting of lower aliphatic tertiary amines and cycloalkyl tertiary amines in an amount sufficient to form a substantially 1:1 molar complex with the AlH$_3$ and removing at least most of the dimethylether from said solution.
9. The method of claim 8 which includes the incorporation into the reaction mixture of an initiator in the form of at least one member selected from the group consisting of a preformed AlH$_3$ and an alkali metal tetrahydridoaluminate.
10. In a method of preparing liquid aromatic hydrocarbon solvent solutions of AlH$_3$, the steps which comprise
  a. providing a slurry of LiH in dimethylether,
  b. providing a solution of AlCl$_3$ in at least one liquid aromatic hydrocarbon solvent selected from the group consisting of benzene and toluene, said solution also containing dimethylether,
  c. the ingredients being proportioned so that the mole ratio of LiH to AlCl$_3$ in the (a) and (b) compositions is essentially 3 to 1, and
  d. gradually adding the (b) solution to the (a) slurry.

11. The method of claim 10 in which said (a) slurry also contains an initiator in the form of at least one member selected from the group consisting of a preformed $AlH_3$ and an alkali metal tetrahydridoaluminate.

12. The method of claim 10 in which during step (d) a part of the dimethylether is allowed to evaporate from the reaction mixture, and the reaction mixture, with or without the further addition of benzene and/or toluene, is filtered.

13. The method of claim 12 in which a stabilizing lower aliphatic tertiary amine is added after step (d) in an amount sufficient to form a substantially 1:1 complex with the $AlH_3$ present.

14. The method of claim 13 in which the amine is a member selected from the group consisting of trimethylamine and triethylamine.

* * * * *